March 11, 1930.  G. L. WALSH  1,750,073
FILTER
Filed March 15, 1929  3 Sheets-Sheet 1
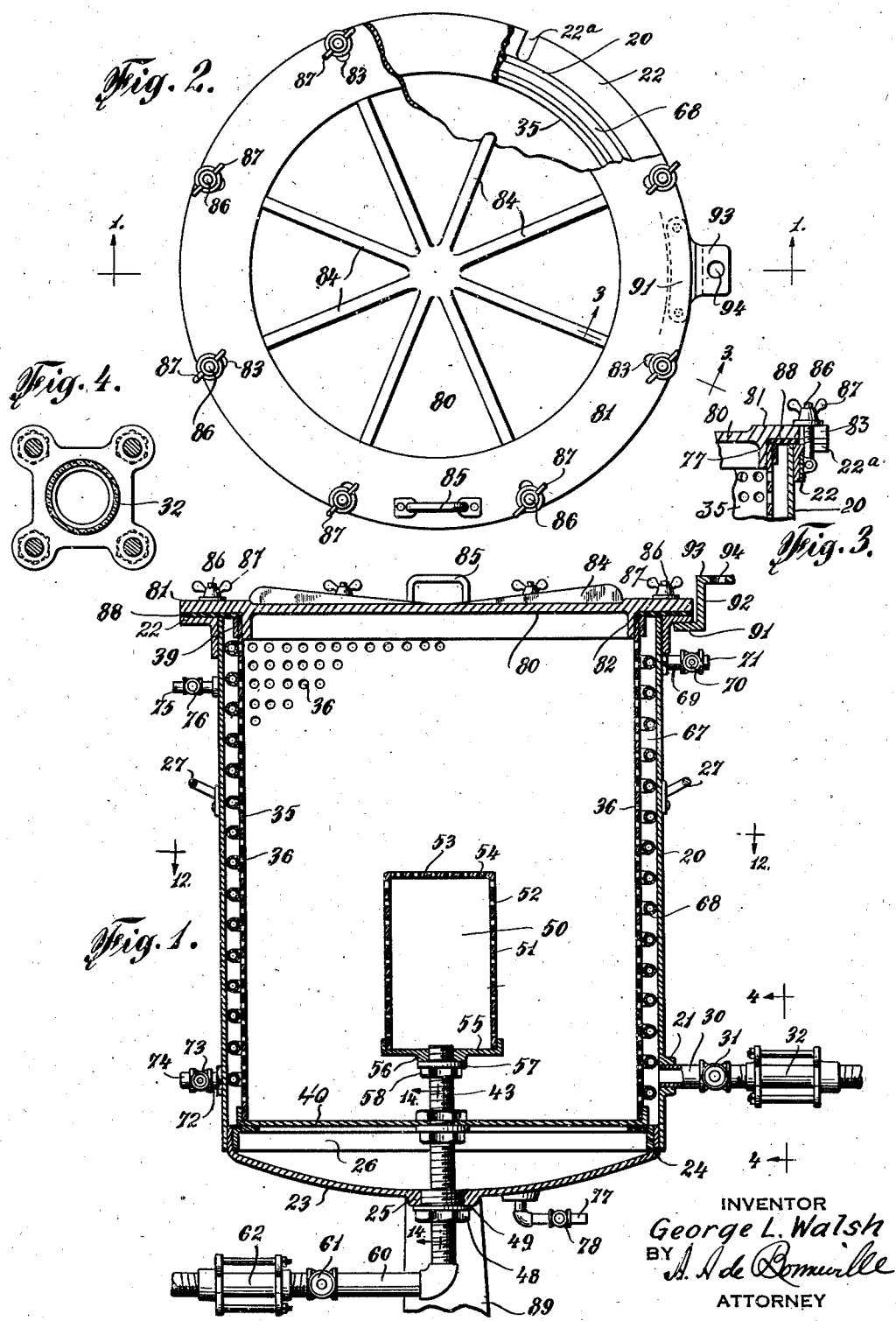

March 11, 1930.  G. L. WALSH  1,750,073
FILTER
Filed March 15, 1929  3 Sheets-Sheet 2
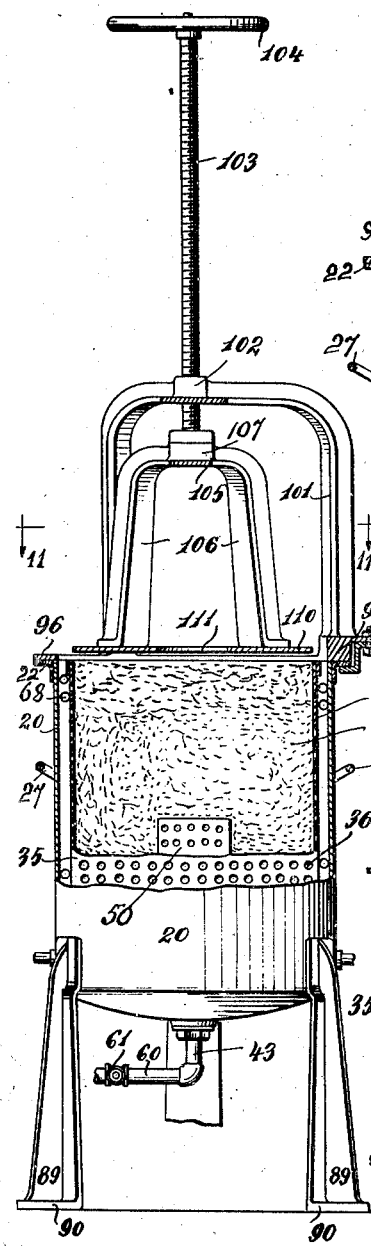
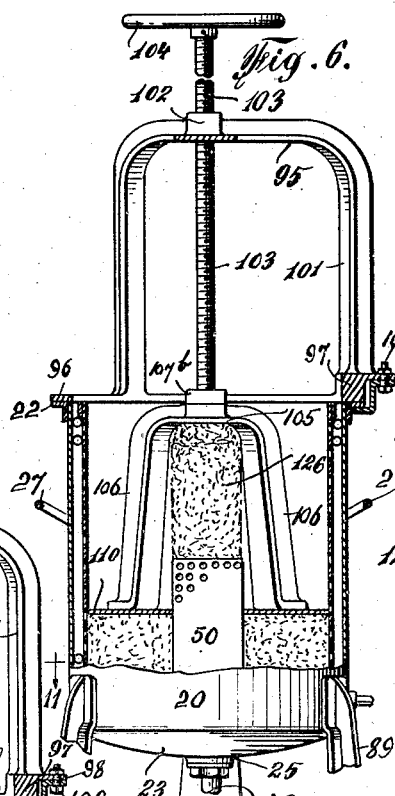
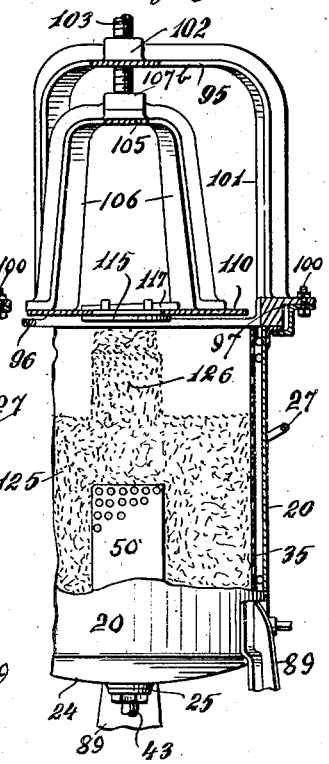
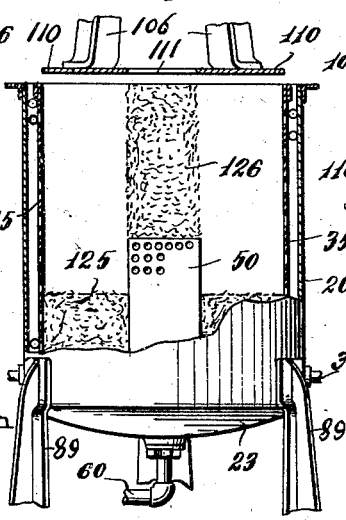
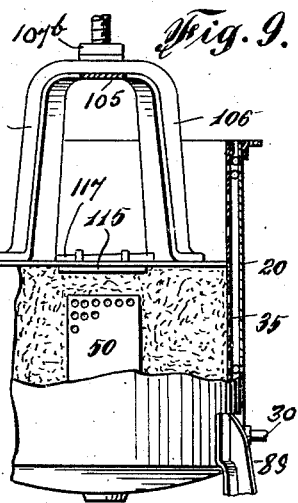
INVENTOR
George L. Walsh
BY
A. A. de Bonneville
ATTORNEY March 11, 1930. G. L. WALSH 1,750,073
FILTER
Filed March 15, 1929 3 Sheets-Sheet 3
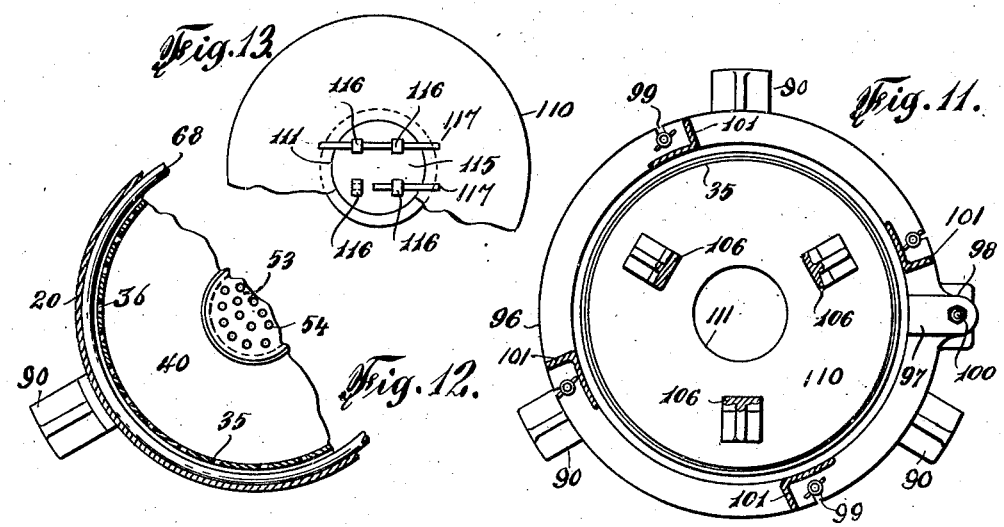
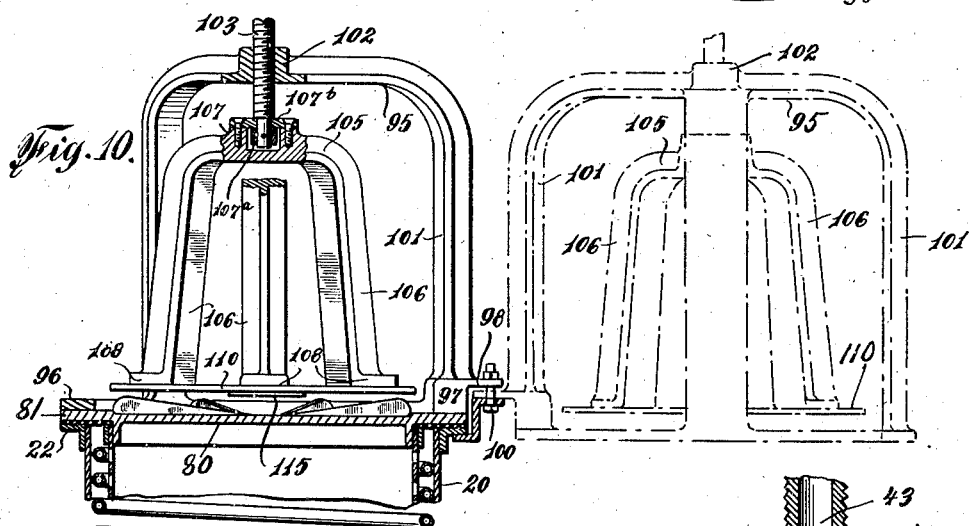
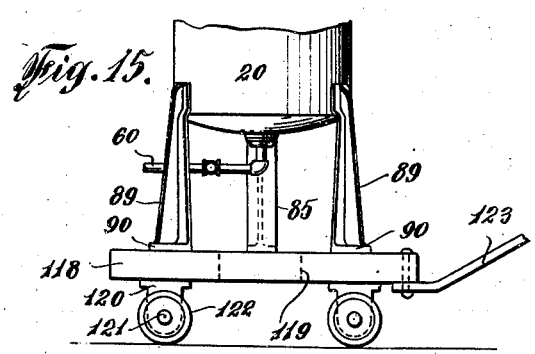
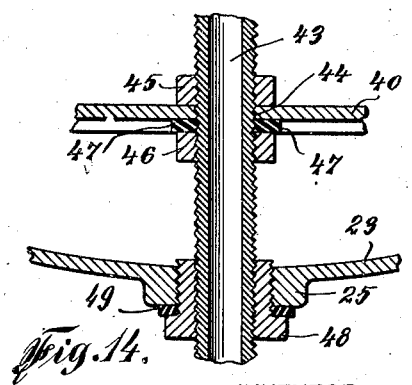
INVENTOR
George L. Walsh
BY
ATTORNEY Patented Mar. 11, 1930

1,750,073

UNITED STATES PATENT OFFICE

GEORGE L. WALSH, OF JERSEY CITY, NEW JERSEY, ASSIGNOR TO JOSEPH M. RECTOR, OF JERSEY CITY, NEW JERSEY

FILTER

Application filed March 15, 1929. Serial No. 347,285.

This invention relates to a filter.

The object of the invention is the production of a filter, by means of which different liquids can be easily and quickly filtered. The second object of the invention is the production of a filter with which the filtering material thereof can be compressed to various degrees, to adapt it for filtering various fluids. The third object of the invention is the production of a filter, by means of which the fluid operated upon can be heated or cooled during the operation of filtering. The fourth object of the invention comprises the steps to uniformly compress the filtering material throughout all portions thereof in a filter.

In the accompanying drawings Fig. 1 represents an axial section of an exemplification, with an element omitted, of the improved filter as on the line 1, 1, of Fig. 2; Fig 2 shows a top plan view of the filter partly broken away; Fig. 3 is a section of Fig. 1 on the line 3, 3; Fig. 4 indicates an enlarged section of Fig. 1 on the line 4, 4; Fig. 5 represents an elevation of the improved filter in partial axial section ready for operation; Fig. 6 shows a view similar to Fig. 5 with its plunger disc lowered indicating the second step in the operation of the filter; Fig. 7 indicates a view similar to Fig. 6 with its plunger disc in its initial or raised position indicating the third step in the operation of the filter; Fig. 8 represents a sectional elevation of the filter with its plunger disc in its raised position and an element added indicating the fourth step of the operation of the filter; Fig. 9 shows a sectional view of the filter similar to Fig. 8 with its disc plunger in a lowered position indicating the fifth step of the operation of the filter; Fig. 10 indicates an enlarged axial section of a fragmentary portion of the filter indicating two positions of one of its elements; Fig. 11 represents a section of Fig. 5 on the line 11, 11; Fig. 12 shows a section of Fig. 1 on the line 12, 12; Fig. 13 represents a fragmentary top plan view of the disc plunger of the filter; Fig. 14 indicates an enlarged section of Fig. 1 on the line 14, 14 and Fig. 15 represents an elevation on a reduced scale of the lower portion of the filter with a modification.

The filter in this instance comprises an outer shell 20 having the boss 21. The said shell 20 may be made of any material suitable for the material operated upon, but is preferably made of copper, glass lined on its outer and inner surfaces. The angle shaped flange 22 having the openings 22ª is fastened to the upper end of said shell. A dished bottom 23 having the flange 24 and the boss 25, is fastened to the lower end of the shell 20. An angle shaped flange 26 is fastened to the flange 24. Supporting handles 27 extend from the shell 20.

An inlet pipe 30 is connected to the boss 21 and preferably in threaded engagement therewith. A valve 31 and sight glass 32 are connected to the pipe 30.

A perforated inner filtering shell 35 having the perforations 36 is located within the shell 20. An annular sleeve 39 is fastened to the upper end of the shell 35 and a cup-shaped bottom 40 is fastened to the lower end of the shell 35. An outlet pipe 43 threaded on its outer surface extends through an opening 44 in the bottom 40. A pair of jam nuts 45, 46 are in threaded engagement with the pipe 43. A packing 47 bears between the bottom 40 and the nut 46, to form a tight joint between the bottom 40 and the pipe 43. A bushing 48 exteriorly and interiorly threaded is in threaded engagement with the boss 25 and with the outlet pipe 43. Packing 49 is interposed between the boss 25 and the bushing 48.

A perforated discharge hood 50 comprises the cylindrical shell 51 with the perforations 52, the top head 53, with the perforations 54, and the bottom head 55 with the threaded boss 56. The outlet pipe 43 supports said discharge hood and is in threaded engagement with the boss 56. A washer or packing 57 bears against the boss 56 and a nut 58 on the outlet pipe 43. To the lower end of the pipe 43 is connected the piping 60, that has connected therewith the valve 61 and the sight glass 62.

In the annular space 67 between the outlet shell 20 and the inner filtering shell 35 is located the helical coil 68. The upper end 69 of said coil extends through the shell 20 and has connected thereto the inlet valve 70 with the inlet piping 71. The lower end 72 of the coil also extends through the shell 20 and has connected thereto the outlet valve 73 with the outlet piping 74. Piping 75 having the valve 76 is connected to the upper portion of the shell 20 and piping 77 having the valve 78 is connected to the bottom 23. A detachable cover for the filter is designated in its entirety by the numeral 80. The said cover 80 has formed therewith the horizontal flange 81 and the depending annular flange 82. Openings 83 are formed in the flange 81 and ribs 84 are formed with said cover 80. Handles 85 are fastened and extend from the flange 81. Swing bolts 86 hinged from the flange 22 extend through openings 22ª and 83 and are provided with the wing nuts 87. An annular packing 88 is interposed between the flange 81 and the upper face of the flange 22. Legs 89 have their upper ends fastened to the lower portion of the shell 20, and are shown with the feet 90.

To the lower face of the horizontal leg of the flange 22 is fastened the bracket having the lower flange 91, the vertical member 92 and the upper flange 93 with the opening 94.

A movable yoke (see Figs. 5 to 11 inclusive) is designated in its entirety by the numeral 95. The yoke comprises the lower annular flange 96 that has formed therewith the heel 97 having the extension 98. Openings 99 are formed in the flange 96. A bolt 100 hinges the said extension 98 to the flange 93. The said yoke 95 has formed therewith four legs 101 that extend upward from the flange 96 and terminate in the threaded boss 102. An operating screw 103 is in threaded engagement with the boss 102 and has fastened to its upper end the operating wheel 104. To the lower end of the screw 103 is rotatably connected the disc plunger yoke designated in its entirety by the numeral 105. The yoke 105 comprises the three legs 106 which at their upper ends terminate in the boss 107. A collar 107ª is fastened to the lower end of the screw 103, and a plate 107ᵇ is fastened to the boss 107 and bears on the collar 107ª. At the lower ends of the legs 106 are formed the feet 108. A disc plunger 110 having the axial opening 111 is fastened to the feet 108. The diameter of the disc plunger 110 is such that it can easily enter the filtering shell 35. A detachable cover 115 is provided for the opening 111. From the upper face of the cover 115 extend lugs 116, which detachably carry the clamping bars 117 which bear against the upper face of the disc plunger 110, when the cover 115 is locked in place.

Referring to Fig. 15, which indicates the filter mounted on a truck, the outer shell is again indicated at 20. The outlet pipe is again shown at 60. The legs 89 have their upper ends fastened to the shell 20 and have formed therewith the feet 90 as already described. A truck is indicated with the platform 118 having the central opening 119. The opening 119 allows a receptacle to be placed under the filter for the purpose of draining the same.

Journal boxes 120 have journaled therein axles 121 for the wheels 122. A handle 123 is pivoted to the platform 118.

To use the filter the cover 80 is removed and the yoke 95 with its appurtenances is swung on the bolt 100 to clear the upper end of the shell 35 as indicated in Fig. 10 in dotted lines. The shell 35 is then filled with the filtering material 125, the nature of which depends upon the nature of the fluid to be filtered. The filtering material may consist of a mixture of cotton, paper pulp, &c. German masse and the like or other suitable material. The operator next compresses the filtering material to a degree compatible to the nature of the fluid to be operated upon. This compression is obtained as follows, that is to say, the operating wheel 104 is turned to lower the disc plunger 110, devoid of its cover 115 to compress the filtering material 125 as indicated in Fig. 6. The operating hand wheel 104 is then turned in the opposite direction to raise the disc plunger 110 as indicated in Fig. 7. By this means a core 126 of the material is obtained, which is not compressed. Next an additional amount of the material 125 is inserted into the shell 35 and the material 125 is again compressed as just described. These steps are repeated until the shell is filled with the annulus of compressed material 125 having the core 126 of the material which is not compressed. By this means the material 125 is compressed in the shell 35 to its bottom 40 and around the hood 50, having the uncompressed core 126. Next the cover 115 is attached to the plunger 110 after additional filtering material has been added, and the disc plunger 110 with its cover 115 is lowered to compress the additional material 125 and the core 126. These steps are repeated until the shell 35 is completely filled with the filtering material and extends somewhat above the top edge of the shell 35. The operator next swings the yoke 95 from the opening in the shell 35 as indicated in dotted lines in Fig. 10 and the cover 80 is located in place as indicated in Fig. 1.

The fluid to be filtered is next introduced into the filter by opening the valve 31 of the piping 30 which latter leads from a reservoir, not shown, of the fluid to be filtered. The said fluid then flows into the space 67 between the shells 20 and 35, and next flows into the interior of the shell 35 through its perforations 36 and is filtered by the filtering material. The filtered fluid then flows through the perforations 52 and 54 of the discharge hood 50 and enters the outlet pipe 43, and from the latter flows through the piping 60 to a suitable collector, not shown. The sight glass 32 enables the operator to view the nature of the fluid as it enters the filter, and the sight glass 62 enables the operator to view the fluid operated upon after having been filtered. Next the operator closes the valve 31 and permits as much as possible of the fluid operated upon to escape by way of the piping 60. The operator may then remove the cover 80 and again cause the disc plunger 110 with its cover 115 to descend to force any remaining fluid in the filtering material therefrom to be discharged by way of the piping 60. During the operation of the filter a hot fluid, steam, or a cold fluid, like cooled brine may be circulated through the coil 68 by opening the valves 70 and 73. After the operation of filtering is finished the filtering material may be cleaned by forcing a cleaning fluid through the space 67 and the other appurtenances of the filter, by opening the valve 76 of the piping 75 and the valve 78 of the piping 77.

The filter with the truck having the platform 118 may be used when it is desired to move the filter to different locations.

The shell 35 may be made of copper tinned.

Various modifications may be made in the invention and the present exemplification is to be taken as illustrative and not limitative thereof.

Having described my invention what I desire to secure by Letters Patent and claim is:

1. In a filter the combination of a shell for a filtering material, a cover detachably connected to said shell, means to insert a fluid to be filtered in the shell, a yoke hinged over the shell, a screw in threaded engagement with said yoke, a yoke in rotative engagement with the lower end of the screw, a disc plunger having an opening connected to the lower end of the latter yoke, a cover detachably connected to said disc plunger under the opening therein, a perforated discharge hood within said shell of a diameter smaller than the diameter of the opening in said disc plunger and a pipe extending from said discharge hood extending through said shell.

2. In a filter the combination of a shell, an angle shaped flange fastened to the upper end of the shell, a cover for said shell detachably connected to said flange, means to insert a fluid to be filtered into said shell; a bracket having a lower flange, a vertical member and an upper flange; said lower flange fastened to said angle flange at the upper end of the shell, a yoke having formed therewith a lower annular flange, a heel formed with said flange, an extension formed with said heel, said extension hinged to the upper flange of said bracket, a screw in threaded engagement with said yoke, a second yoke rotatively connected to the lower end of the screw, a disc plunger having an opening connected to the lower end of the second yoke, a cover detachably connected to said disc plunger below the opening therein, a perforated discharge hood within said shell of a diameter smaller than the diameter of the opening in said disc plunger and a pipe extending from said discharge hood through said shell.

Signed at the borough of Manhattan city of New York, in the county of New York and State of New York, this 12th day of March, A. D. 1929.

GEORGE L. WALSH.